(12) United States Patent
Kumazaki

(10) Patent No.: US 12,384,354 B2
(45) Date of Patent: Aug. 12, 2025

(54) VEHICLE CONTROL DEVICE, STORAGE MEDIUM FOR STORING COMPUTER PROGRAM FOR VEHICLE CONTROL, AND METHOD FOR CONTROLLING VEHICLE

(71) Applicant: TOYOTA JIDOSHA KABUSHIKI KAISHA, Toyota (JP)

(72) Inventor: Kenta Kumazaki, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 380 days.

(21) Appl. No.: 18/165,700

(22) Filed: Feb. 7, 2023

(65) Prior Publication Data
US 2023/0322201 A1    Oct. 12, 2023

(30) Foreign Application Priority Data
Apr. 6, 2022    (JP) .................... 2022-063549

(51) Int. Cl.
*B60W 20/10*    (2016.01)
*B60W 10/06*    (2006.01)
(Continued)

(52) U.S. Cl.
CPC ............ *B60W 20/10* (2013.01); *B60W 10/06* (2013.01); *B60W 30/18163* (2013.01);
(Continued)

(58) Field of Classification Search
CPC ............... B60W 20/10; B60W 10/06; B60W 30/18163; B60W 50/10; B60W 2554/80;
(Continued)

(56) References Cited

U.S. PATENT DOCUMENTS

| | | | |
|---|---|---|---|
| 2009/0240408 A1* | 9/2009 | Wolfgang | B60W 30/16 701/55 |
| 2010/0023218 A1 | 1/2010 | Hayakawa et al. | |
| 2010/0049375 A1 | 2/2010 | Tanimoto | |
| 2014/0062704 A1* | 3/2014 | Kubotani | G08B 21/06 340/575 |

(Continued)

FOREIGN PATENT DOCUMENTS

| | | |
|---|---|---|
| JP | 2010-52717 A | 3/2010 |
| JP | 2017-177976 A | 10/2017 |

(Continued)

OTHER PUBLICATIONS

Original and Machine translation of WO 2017186535 A1 (Year: 2017).*
On the roles of eye gaze and head dynamics in predicting driver's intent to change lanes, IEEE Trans on Intelligent Transportation Systems, vol. 10(3), pp. 453-462 (Year: 2009).*

*Primary Examiner* — Frederick M Brushaber
(74) *Attorney, Agent, or Firm* — Sughrue Mion, PLLC

(57) ABSTRACT

A vehicle control device has a processor configured to determine whether or not a driver is attempting to move a vehicle from a traveling lane in which the vehicle is traveling to an adjacent lane, based on a monitor image taken of an area near a driving seat, and to activate the engine when it has been determined that the driver is attempting to move the vehicle from the traveling lane to the adjacent lane and the engine is stopped with drive power being obtained using the electric motor, wherein the vehicle is accelerated using the drive power of the engine when the engine is activated, if movement of the vehicle from the traveling lane to the adjacent lane has been requested by the driver.

5 Claims, 7 Drawing Sheets

(51) Int. Cl.
*B60W 30/18* (2012.01)
*B60W 50/10* (2012.01)
*G06V 40/16* (2022.01)

(52) U.S. Cl.
CPC ............ *B60W 50/10* (2013.01); *G06V 40/16* (2022.01); *B60W 2554/80* (2020.02); *B60W 2555/60* (2020.02)

(58) Field of Classification Search
CPC ............ B60W 2555/60; B60W 20/19; B60W 20/20; B60W 50/06; B60W 2540/10; B60W 2540/225; B60W 20/40; B60W 2710/06; G06V 40/16; G06V 10/454; G06V 10/82; G06V 20/597; G06V 40/161; G06V 40/171; Y02T 10/62
See application file for complete search history.

(56) References Cited

U.S. PATENT DOCUMENTS

| | | | | |
|---|---|---|---|---|
| 2014/0375810 | A1* | 12/2014 | Rodriguez | B60Q 1/525 |
| | | | | 348/148 |
| 2015/0379362 | A1* | 12/2015 | Calmes | G06T 7/20 |
| | | | | 348/136 |
| 2019/0138790 | A1 | 5/2019 | Matsumura et al. | |
| 2021/0188264 | A1* | 6/2021 | Okuda | G08G 1/096791 |

FOREIGN PATENT DOCUMENTS

| | | | | |
|---|---|---|---|---|
| JP | 2019-087150 A | | 6/2019 | |
| WO | 2008/136456 A1 | | 11/2008 | |
| WO | WO-2017186535 A1 | * | 11/2017 | ...... B60W 30/18018 |
| WO | 2019/244261 A1 | | 12/2019 | |

\* cited by examiner

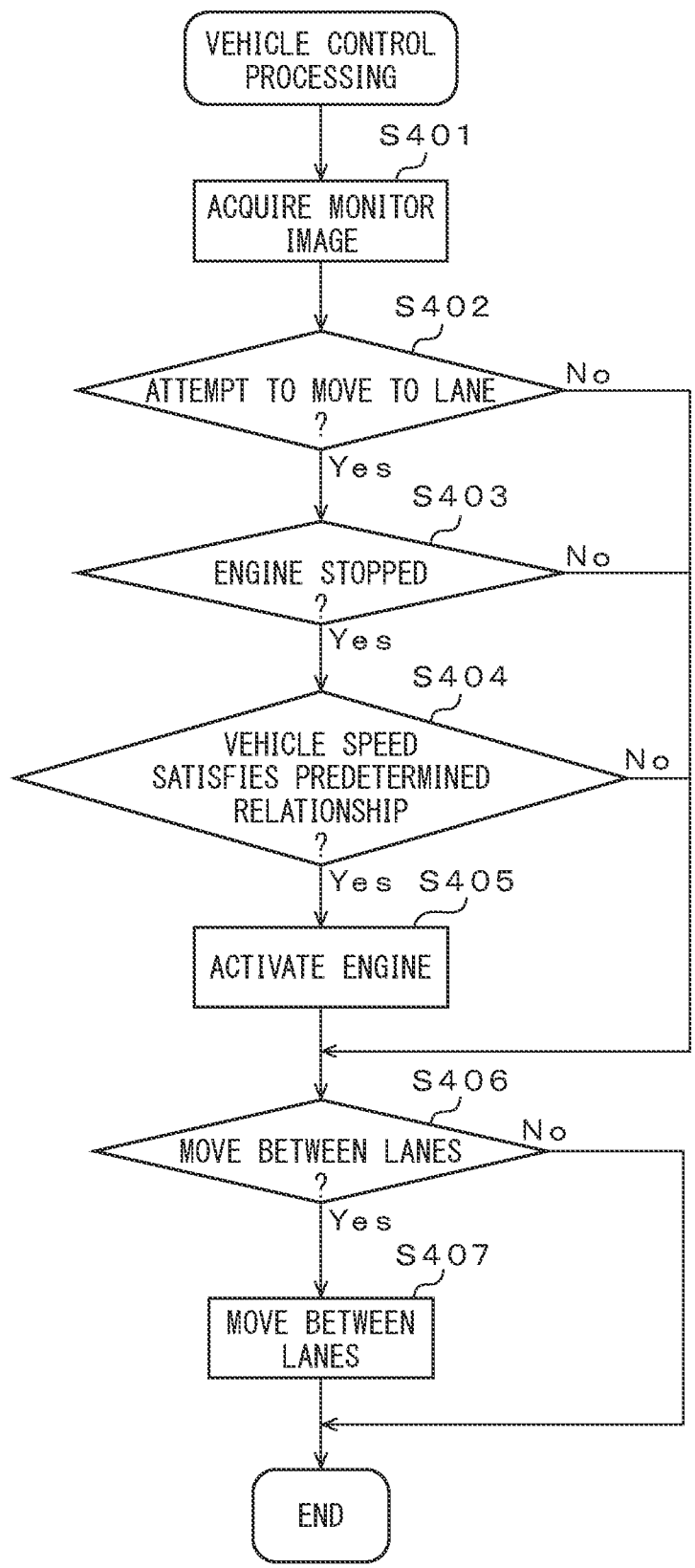

VEHICLE CONTROL DEVICE, STORAGE MEDIUM FOR STORING COMPUTER PROGRAM FOR VEHICLE CONTROL, AND METHOD FOR CONTROLLING VEHICLE

FIELD

The present disclosure relates to a vehicle control device, to a storage medium storing a computer program for vehicle control, and to a method for controlling a vehicle.

BACKGROUND

An autonomous control system mounted in a vehicle generates a navigation route for the vehicle based on the current location of the vehicle, the destination location of the vehicle, and a navigation map. The autonomous control system estimates the current location of the vehicle using the map information and controls the vehicle to travel along the navigation route.

The drive unit of a hybrid vehicle has an engine and an electric motor. An autonomous control system controls operation of an engine and electric motor in response to the running state of a vehicle, for appropriate acceleration of the vehicle (see International Patent Publication No. WO2019/244261, for example). When the vehicle is traveling steady, for example, the autonomous control system controls a drive unit to stop the engine and generate drive power by the electric motor.

SUMMARY

When the vehicle is traveling steady on a traveling lane, the driver may sometimes decide to pass another vehicle that is ahead in the traveling lane. The driver makes a request to the autonomous control system of the vehicle for movement between lanes, in order to move from the traveling lane to the adjacent passing lane.

In response to the driver request, the autonomous control system of the vehicle generates a driving plan for movement from the traveling lane to the adjacent passing lane, and movement between lanes is executed based on the driving plan. When a request has been received from the driver for movement from the traveling lane to the adjacent passing lane, and if the engine was stopped, the autonomous control system starts the engine for movement to the passing lane and uses drive power of the engine for acceleration. This has resulted in a problem, however, due to the delay produced when the vehicle is accelerated using drive power of the engine.

It is an object of the present disclosure to provide a vehicle control device that can accelerate a vehicle at an appropriate timing when the driver is attempting to move the vehicle from the traveling lane to an adjacent lane.

One embodiment of the present disclosure provides a vehicle control device for a vehicle having an engine and an electric motor. The vehicle control device has a determining unit that determines whether or not a driver is attempting to move the vehicle from a traveling lane in which the vehicle is traveling to an adjacent lane, based on a monitor image taken of an area near a driving seat, and a control unit that activates the engine when it has been determined by the determining unit that the driver is attempting to move the vehicle from the traveling lane to the adjacent lane and the engine is stopped with drive power being obtained using the electric motor, in which the control unit accelerates the vehicle using the drive power of the engine when the engine is activated, if movement of the vehicle from the traveling lane to the adjacent lane has been requested by the driver.

In this vehicle control device, preferably the determining unit determines the direction of the face of the driver based on the monitor image, and if the elapsed time obtained by summing the time that the face of the driver has been facing the adjacent lane side within a predetermined assessment cycle has reached a first reference time, the determining unit determines that the driver is attempting to move the vehicle from the traveling lane to the adjacent lane.

The control unit in the vehicle control device also preferably activates the engine when difference between speed of the vehicle and average speed of another vehicle traveling in the adjacent lane, or difference between the speed of the vehicle and a traveling lane speed limit, is at or above a predetermined reference speed difference, and when it has been determined by the determining unit that the driver is attempting to move the vehicle from the traveling lane to the adjacent lane and the engine is stopped with drive power being obtained using the electric motor.

According to another embodiment of the present disclosure, a non-transitory storage medium storing a computer program for vehicle control is provided. The computer program for vehicle control causes a processor execute a process and the process includes determining whether or not a driver is attempting to move the vehicle from a traveling lane in which the vehicle is traveling to an adjacent lane, based on a monitor image taken of an area near a driving seat, and activating the engine when it has been determined that the driver is attempting to move the vehicle from the traveling lane to the adjacent lane and the engine is stopped with drive power being obtained using the electric motor, in which the vehicle is accelerated using the drive power of the engine when the engine is activated, if movement of the vehicle from the traveling lane to the adjacent lane has been requested by the driver.

Yet another embodiment of the present disclosure provides a method for controlling a vehicle carried out by a vehicle control device. The method includes determining whether or not a driver is attempting to move the vehicle from a traveling lane in which the vehicle is traveling to an adjacent lane, based on a monitor image taken of an area near a driving seat, and activating the engine when it has been determined that the driver is attempting to move the vehicle from the traveling lane to the adjacent lane and the engine is stopped with drive power being obtained using the electric motor, in which the vehicle is accelerated using the drive power of the engine when the engine is activated, if movement of the vehicle from the traveling lane to the adjacent lane has been requested by the driver.

The vehicle control device of the present disclosure can accelerate a vehicle at an appropriate timing by activating the stopped engine, when the driver is attempting to move the vehicle from the traveling lane to an adjacent lane.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 8 is an example of an operation flow chart for vehicle control processing by a second modified example of the vehicle control device of the embodiment.

DESCRIPTION OF EMBODIMENTS

Figure 1A:
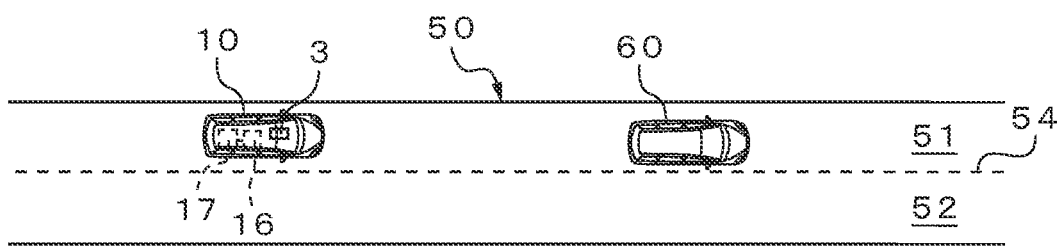
FIG. 1A is a diagram showing operation of the vehicle control device of the embodiment in overview, and showing a vehicle traveling on a road.
Figure 1B:
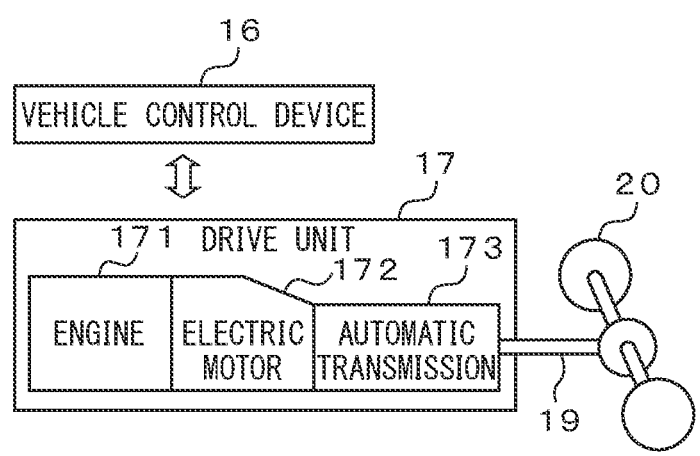
FIG. 1B is a diagram illustrating operation of the vehicle control device of the embodiment in overview, and showing the vehicle control device and a drive unit.

FIG. 1A and FIG. 1B are diagrams illustrating in overview the operation of the vehicle control device 16 of the embodiment, FIG. 1A showing a vehicle traveling on a road, and FIG. 1B showing the vehicle control device and a drive unit. Operation relating to vehicle control processing by the vehicle control device 16 disclosed herein will now be described in overview with reference to FIG. 1A and FIG. 1B.

The vehicle 10 has a vehicle control device 16 and a drive unit 17. The vehicle control device 16 controls the drive unit 17 based on a predetermined driving plan. The drive unit 17 has an engine 171, an electric motor 172 and an automatic transmission 173. The drive unit 17 is controlled by the vehicle control device 16 to regulate output from the engine 171 and electric motor 172. The drive unit 17 is also controlled by the vehicle control device 16 to regulate the gear stage or speed ratio of the automatic transmission 173. Output from the engine 171 and electric motor 172 is converted by the automatic transmission 173 to rotary force with a predetermined rotational speed, and is transmitted to the tires 20 via an output shaft 19.

The vehicle 10 is traveling on the road 50, as shown in FIG. 1A. The road 50 has two lanes 51, 52. The lane 51 and lane 52 are divided by a lane marking line 54. The vehicle 10 is traveling in the lane 51 while another vehicle 60 is traveling ahead of the vehicle 10.

The vehicle 10 is traveling steady on the lane 51 of the road 50. While traveling steady, the vehicle 10 travels at a constant speed with a relatively low load. Since the vehicle 10 is traveling steady, the vehicle control device 16 stops the engine 171 and uses the electric motor 172 to obtain drive power.

The driver has decided to pass the other vehicle 60 ahead on the lane 51, and therefore directs the face several times to the lane 52 in order to examine the state of the adjacent passing lane 52.

Based on a monitor image taken of the area near the driving seat of the vehicle 10 by the monitoring camera 3, the vehicle control device 16 determines that the driver is attempting to move the vehicle 10 from the lane 51 in which the vehicle 10 is traveling to the adjacent lane 52.

Since the drive unit 17 had stopped the engine 171 and was obtaining drive power using the electric motor 172, the vehicle control device 16 activates the engine 171. This allows the drive unit 17 to use the engine 171 and electric motor 172 for acceleration of the vehicle 10.

The driver also makes a request to the vehicle control device 16 of the vehicle 10 for movement from the lane 51 to the adjacent passing lane 52.

Since a request has been made by the driver for movement of the vehicle 10 from the lane 51 to the adjacent lane 52, the vehicle control device 16 accelerates the vehicle 10 using drive power of the engine 171 and electric motor 172.

The vehicle 10 is moved between lanes by gently accelerating the vehicle 10 in response to the driver's request for a lane change. After having passed the other vehicle 60, the vehicle 10 is then moved from the lane 52 to the lane 51.

As explained above, when the driver is attempting to move the vehicle 10 from the traveling lane 51 to the adjacent lane 52, the vehicle control device 16 activates the engine 171 in advance, thus allowing the vehicle 10 to be accelerated at an appropriate timing by using the drive power of the engine 171 and electric motor 172.

Figure 2:
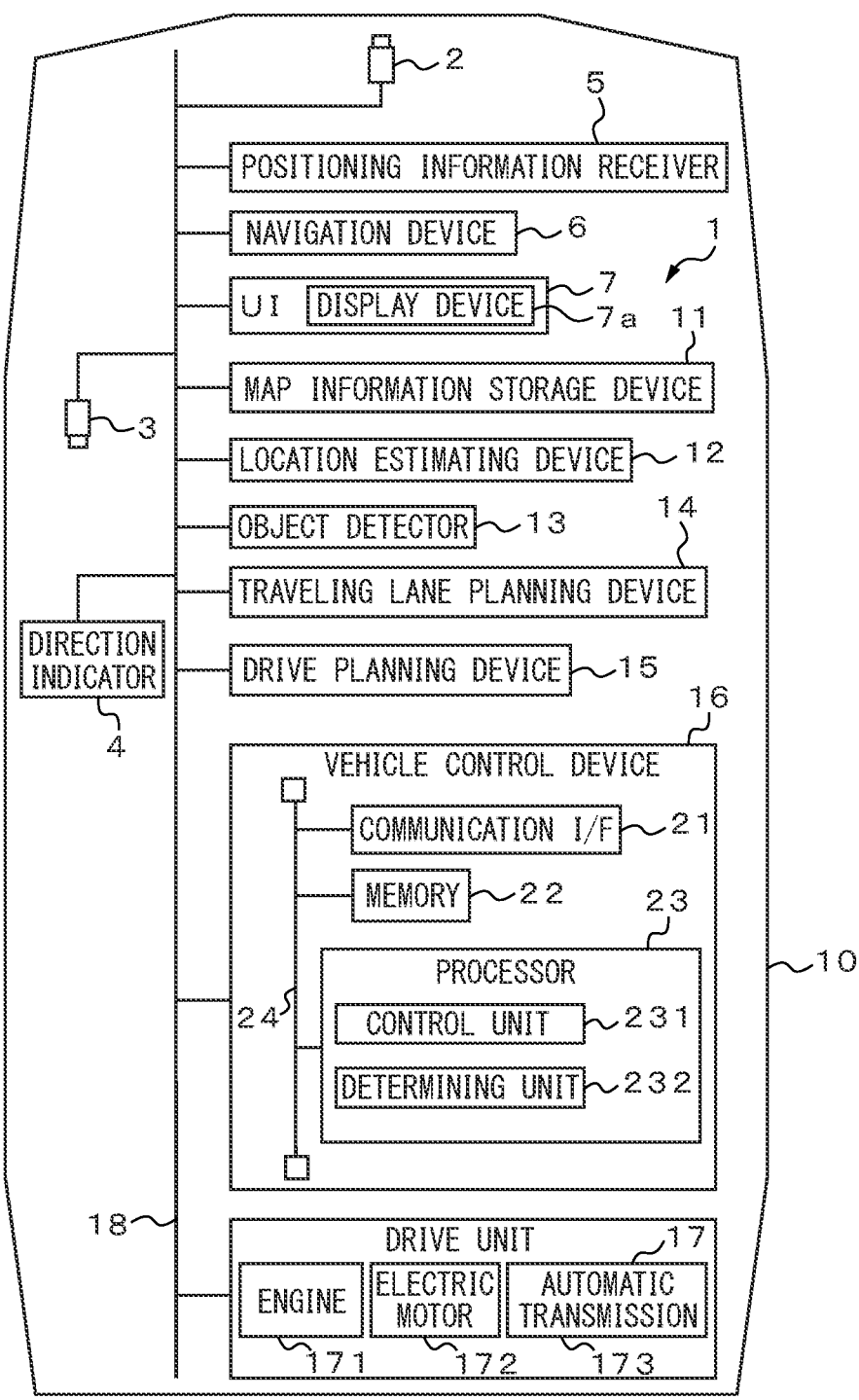
FIG. 2 is a general schematic drawing of a vehicle in which a vehicle control system of the embodiment is mounted.

FIG. 2 is a general schematic drawing of a vehicle 10 in which a vehicle control system 1 of the embodiment is mounted. The vehicle 10 has a front camera 2, a monitoring camera 3, a direction indicator 4, a positioning information receiver 5, a navigation device 6, a user interface (UI) 7, a map information storage device 11, a location estimating device 12, an object detector 13, a traveling lane planning device 14, a drive planning device 15, a vehicle control device 16 and a drive unit 17. The vehicle 10 may also have a LiDAR sensor, as a distance sensor (not shown) for measurement of the distance of the vehicle 10 to surrounding objects. The vehicle control system 1 has at least the direction indicator 4, the traveling lane planning device 14, the drive planning device 15 and the vehicle control device 16.

The front camera 2, monitoring camera 3, direction indicator 4, positioning information receiver 5, navigation device 6, UI 7, map information storage device 11, location estimating device 12, object detector 13, traveling lane planning device 14, drive planning device 15, vehicle control device 16 and drive unit 17 are connected in a communicable manner through an in-vehicle network 18 that conforms to controller area network standards.

The front camera 2 is an example of an imaging unit provided in the vehicle 10. The front camera 2 is mounted inside the vehicle 10 and directed toward the front of the vehicle 10. The front camera 2, for example, takes a camera image in which the environment of a predetermined region ahead of the vehicle 10 is shown, at a predetermined cycle. The camera image can show the road in the predetermined region ahead of the vehicle 10, and road features such as surface lane marking lines on the road. The front camera 2 has a 2D detector composed of an array of photoelectric conversion elements with visible light sensitivity, such as a CCD or C-MOS, and an imaging optical system that forms an image of the photographed region on the 2D detector.

Each time a camera image is taken, the front camera 2 outputs the camera image and the camera image photograph time at which the camera image was taken, through the in-vehicle network 18 to the location estimating device 12 and object detector 13, etc. The camera image is also used for processing at the location estimating device 12 to estimate the location of the vehicle 10. At the object detector 13, the camera image is used for processing to detect other objects surrounding the vehicle 10.

The monitoring camera 3 is disposed in the vehicle compartment in a manner allowing it to photograph monitor images including the area near the driving seat. The monitor image also includes the face of the driver driving the vehicle 10. The monitoring camera 3 is an example of a photographing device that takes monitor images including the face of the driver. The monitoring camera 3 may also be disposed on the steering column, room mirror, meter panel or meter hood (not shown), etc., for example.

The monitoring camera 3 takes monitor images in a predetermined cycle, for example. The monitoring camera 3 has a 2D detector composed of an array of photoelectric conversion elements with infrared sensitivity, such as a CCD or C-MOS, and an imaging optical system that forms an image of the photographed region on the 2D detector. Each time a monitor image is taken, the monitoring camera 3 outputs the monitor image and the monitor imaging time at which the monitor image was taken, to the vehicle control device 16, etc. via the in-vehicle network 18.

The direction indicator 4 is disposed near the steering wheel (not shown) to allow its operation by the driver. When the vehicle 10 is being driven primarily by the vehicle control system 1, the driver requesting movement of the vehicle 10 between lanes operates the direction indicator 4 toward the lane to which movement of the vehicle 10 is desired. The direction indicator 4 generates an operation signal that corresponds to operation by the driver. The direction indicator 4 outputs the operation signal to the traveling lane planning device 14 and the vehicle control device 16, etc. via the in-vehicle network 18. When the vehicle 10 is being driven primarily by the driver, the driver operates the direction indicator 4 toward the side to which the vehicle 10 is to be moved, for movement of the vehicle 10 to the left, right or between lanes. A directional indicator lamp (not shown) flashes based on the operation signal output by the direction indicator 4.

The positioning information receiver 5 outputs positioning information that represents the current location of the vehicle 10. The positioning information receiver 5 may be a GNSS receiver, for example. The positioning information receiver 5 outputs positioning information and the positioning information acquisition time at which the positioning information has been acquired, to the navigation device 6 and map information storage device 11, etc., each time positioning information is acquired at a predetermined receiving cycle.

Based on the navigation map information, the destination location of the vehicle 10 input through the UI 7, and positioning information representing the current location of the vehicle 10 input from the positioning information receiver 5, the navigation device 6 creates a navigation route from the current location to the destination location of the vehicle 10. The navigation route includes information relating to the locations of right turns, left turns, merging and branching. When the destination location has been newly set or the current location of the vehicle 10 has exited the navigation route, the navigation device 6 creates a new navigation route for the vehicle 10. Every time a navigation route is created, the navigation device 6 outputs the navigation route to the location estimating device 12 and the traveling lane planning device 14, etc., via the in-vehicle network 18.

The UI 7 is an example of the notification unit. The UI 7, controlled by the navigation device 6, drive planning device 15 and vehicle control device 16, etc., notifies the driver of the vehicle 10 traveling information. The traveling information of the vehicle 10 includes information relating to the current location of the vehicle, executing of lane changes, and the current and future route of the vehicle, such as the navigation route. The UI 7 has a display device 7a such as a liquid crystal display or touch panel, for display of the traveling information. The UI 7 may also have an acoustic output device (not shown) to notify the driver of traveling information. The UI 7 also generates an operation signal in response to operation of the vehicle 10 by the driver. The operation information may be, for example, a destination location, transit points, vehicle speed or other control information. The UI 7 also has a touch panel or operating button, for example, as an input device for inputting operation information from the driver to the vehicle 10. The UI 7 outputs the input operation information to the navigation device 6, the drive planning device 15 and the vehicle control device 16, etc., via the in-vehicle network 18.

The map information storage device 11 stores wide-area map information for a relatively wide area (an area of 10 to 30 km$^2$, for example) that includes the current location of the vehicle 10. The map information preferably has high precision map information including three-dimensional information for the road surface, the speed limit for the road, the curvature of the road, and information for the types and locations of structures and road features such as road lane marking lines.

The map information storage device 11 receives the wide-area map information from an external server via a base station, by wireless communication through a wireless communication device (not shown) mounted in the vehicle 10, in relation to the current location of the vehicle 10, and stores it in the storage device. Each time positioning information is input from the positioning information receiver 5, the map information storage device 11 refers to the stored wide-area map information and outputs map information for a relatively narrow area including the current location represented by the positioning information (for example, an area of 100 m$^2$ to 10 km$^2$), through the in-vehicle network 18 to the location estimating device 12, object detector 13, traveling lane planning device 14, drive planning device 15 and vehicle control device 16.

The location estimating device 12 estimates the location of the vehicle 10 at the camera image photograph time, based on the road features surrounding the vehicle 10 represented in the camera image taken by the front camera 2. For example, the location estimating device 12 compares lane marking lines identified in the camera image with lane marking lines represented in the map information input from the map information storage device 11, and determines the estimated location and estimated declination of the vehicle 10 at the camera image photograph time. The location estimating device 12 estimates the road traveling lane where the vehicle 10 is located, based on the lane marking lines represented in the map information and on the estimated location and estimated declination of the vehicle 10. Each time the estimated location, estimated declination and traveling lane of the vehicle 10 are determined at the camera image photograph time, the location estimating device 12 outputs this information to the object detector 13, traveling lane planning device 14, drive planning device 15 and vehicle control device 16.

The object detector 13 detects other objects around the vehicle 10 and their types (for example, vehicles) based on the camera image. Other objects also include other vehicles traveling around the vehicle 10. The object detector 13 tracks other detected objects and determines the trajectories and speeds of the other objects. In addition, the object detector 13 identifies the traveling lanes in which the other objects are traveling, based on the lane marking lines represented in the map information and the locations of the objects. The object detector 13 also outputs object detection information which includes information representing the types of other objects that were detected, information indicating their locations and speeds, and also information indicating their traveling lanes, to the traveling lane planning device 14, drive planning device 15 and vehicle control device 16.

At a traveling lane-planning creation time set in a predetermined cycle, the traveling lane planning device 14 selects a traffic lane on the road on which the vehicle 10 is traveling, within the nearest driving zone (for example, 10 km) selected from the navigation route, based on the map information, the navigation route and surrounding environment information and the current location of the vehicle 10, and creates a traveling lane plan representing the scheduled traveling lane for traveling of the vehicle 10. The surrounding environment information includes the locations and speeds of other vehicles traveling around the vehicle 10. For example, the traveling lane planning device 14 creates a traveling lane plan for the vehicle 10 to travel on a traffic lane other than a passing lane. Each time a traveling lane plan is created, the traveling lane planning device 14 outputs the traveling lane plan to the drive planning device 15.

At a driving plan creation time set with a predetermined cycle, the drive planning device 15 carries out driving plan processing in which it creates a driving plan representing the scheduled traveling trajectory of the vehicle 10 up until a predetermined time (for example, 5 seconds), based on the traveling lane plan, the map information, the current location of the vehicle 10, the surrounding environment information and the vehicle status information. The vehicle status information includes the current location of the vehicle 10, and the vehicle speed, acceleration and traveling direction. The driving plan is represented as a combination of the target location of the vehicle 10 and the target vehicle speed at the target location, at each time from the current time until the predetermined time. The cycle in which the driving plan is created is preferably shorter than the cycle in which the traveling lane plan is created. The drive planning device 15 generates a driving plan to maintain a spacing of at least a predetermined distance between the vehicle 10 and other objects (such as vehicles). The drive planning device 15 outputs the driving plan to the vehicle control device 16 for each driving plan generated.

The vehicle control device 16 carries out control processing and assessment processing. For this purpose, the vehicle control device 16 has a communication interface (IF) 21, a memory 22 and a processor 23. The communication interface 21, memory 22 and processor 23 are connected via signal wires 24. The communication interface 21 has an interface circuit to connect the vehicle control device 16 with the in-vehicle network 18.

The memory 22 is an example of a memory unit, and it has a volatile semiconductor memory and a non-volatile semiconductor memory, for example. The memory 22 stores an application computer program and various data to be used for information processing carried out by the processor 23.

All or some of the functions of the vehicle control device 16 are carried out by functional modules driven by a computer program operating on the processor 23, for example. The processor 23 has a control unit 231 and a determining unit 232. Alternatively, the functional module of the processor 23 may be a specialized computing circuit in the processor 23. The processor 23 comprises one or more CPUs (Central Processing Units) and their peripheral circuits. The processor 23 may also have other computing circuits such as a logical operation unit, numerical calculation unit or graphic processing unit.

The control unit 231 controls each unit of the vehicle 10 based on the current location of the vehicle 10 and the vehicle speed and yaw rate, as well as on the driving plan generated by the drive planning device 15. For example, the control unit 231 determines the steering angle, acceleration and angular acceleration of the vehicle 10 according to the driving plan and the speed and yaw rate of the vehicle 10, and sets the amount of steering, and the accelerator or brake level so as to match that steering angle, accelerator level and angular acceleration. The control unit 231 also outputs a control signal corresponding to a set steering amount, to an actuator (not shown) that controls the steering wheel for the vehicle 10, via the in-vehicle network 18. The vehicle control device 16 also outputs a control signal corresponding to the set accelerator level, to the drive unit 17 of the vehicle 10, via the in-vehicle network 18. Alternatively, the vehicle control device 16 may output a control signal corresponding to a set brake level to the brake (not shown) of the vehicle 10, via the in-vehicle network 18. Other operation by the vehicle control device 16 will be described in detail below.

The drive unit 17 has an engine 171, an electric motor 172 and an automatic transmission 173. Operation of the rotational speed of the engine 171 and electric motor 172 is controlled by the vehicle control device 16. The gear stage or speed ratio of the automatic transmission 173 is also controlled by the vehicle control device 16. The gear stage or speed ratio of the automatic transmission 173 can be set according to the speed of the vehicle 10 and the required rotary force. For example, when the speed of the vehicle 10 and gear stage are set, the rotational speed output from the electric motor 172 to the automatic transmission 173 becomes set, and this rotational speed is used as the basis for appropriately setting the rotational speed output from the engine 171 to the electric motor 172. It is often the case when the vehicle 10 is traveling at a constant speed under low load, that the engine 171 is stopped and drive power is obtained from the electric motor 172. The electric motor 172 may consist of several motors.

The map information storage device 11, location estimating device 12, object detector 13, traveling lane planning device 14, drive planning device 15 and vehicle control device 16 are electronic control units (ECU), for example. For FIG. 2, the map information storage device 11, location estimating device 12, object detector 13, traveling lane planning device 14, drive planning device 15 and vehicle control device 16 were explained as separate devices, but all or some of them may be constructed in a single device.

Figure 3:
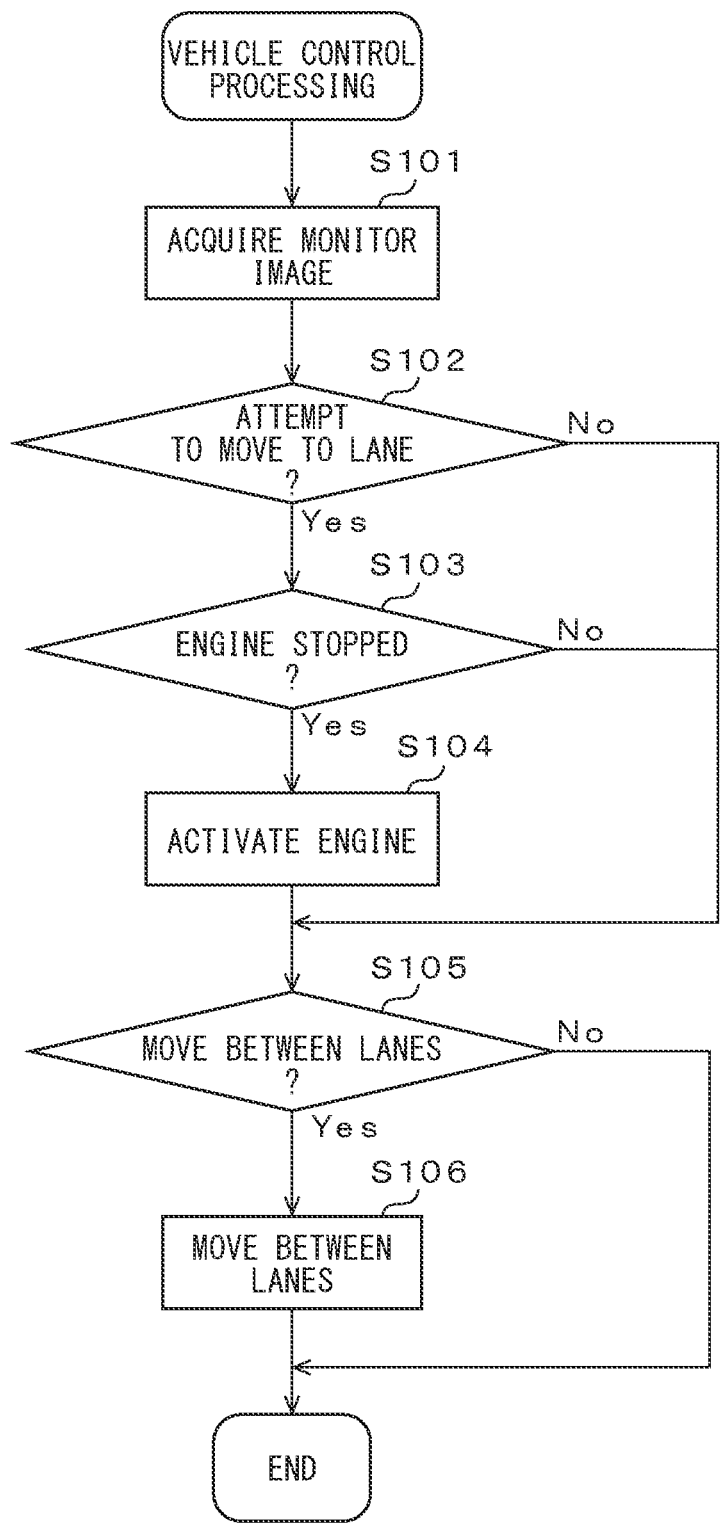
FIG. 3 is an example of an operation flow chart for vehicle control processing by the vehicle control device of the embodiment.

FIG. 3 is an example of an operation flow chart for vehicle control processing by the vehicle control device 16 of the embodiment. Vehicle control processing by the vehicle control device 16 will be described below with reference to FIG. 3. The vehicle control device 16 carries out vehicle control processing according to the operation flow chart shown in FIG. 3, at a vehicle control time having a predetermined cycle.

The determining unit 232 first acquires a monitor image from the monitoring camera 3 (step S101). The area near the driving seat is shown in the monitor image, and may include the face of the driver.

Next, based on the monitor image, the determining unit 232 determines whether or not the driver is attempting to move the vehicle 10 from the traveling lane in which the vehicle 10 is traveling to an adjacent lane (step S102). This processing is described in detail below.

When the driver is attempting to move the vehicle 10 from the traveling lane in which the vehicle 10 is traveling to an adjacent lane (step S102—Yes), the control unit 231 determines whether or not the engine 171 is stopped (step S103).

If the engine is stopped (step S103—Yes), the control unit 231 activates the engine 171 (step S104). This allows the drive unit 17 to use the engine 171 and electric motor 172 for acceleration of the vehicle 10.

The control unit 231 then determines whether or not movement between lanes has been planned, based on the driving plan (step S105). In response to a movement request by the driver for movement between lanes, the drive planning device 15 creates a driving plan including movement between lanes and outputs it to the vehicle control device 16.

When movement between lanes has been planned (step S104—Yes), the drive unit 17 is controlled by the control unit 231 to accelerate the vehicle 10 using the engine 171 and electric motor 172 for movement between lanes (step S106), and the series of processing steps is complete.

When movement of the vehicle between lanes has not been planned (step S104—No), the series of processing steps is complete.

When the driver is not attempting to move the vehicle 10 from the traveling lane in which the vehicle 10 is traveling to an adjacent lane (step S102—No), or when the engine is not stopped (step S103—No), the control unit 231 determines whether or not movement between lanes is planned, based on the driving plan (step S105).

When movement between lanes has been planned (step S104—Yes), and if the engine 171 is activated, the drive unit 17 is controlled by the control unit 231 to accelerate the vehicle 10 using the engine 171 and electric motor 172 for movement between lanes (step S106), and the series of processing steps is complete. When the engine 171 is not activated, on the other hand, the drive unit 17 activates the engine 171 and then uses the engine 171 and electric motor 172 to accelerate the vehicle 10 to move between lanes (step S106), and the series of processing steps is complete.

Figure 4A:
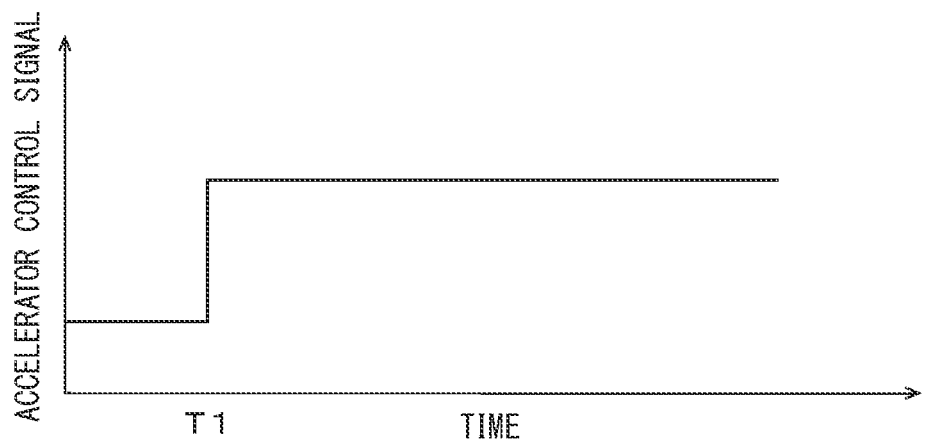
FIG. 4A is a diagram showing the relationship between accelerator control signal and time.
Figure 4B:
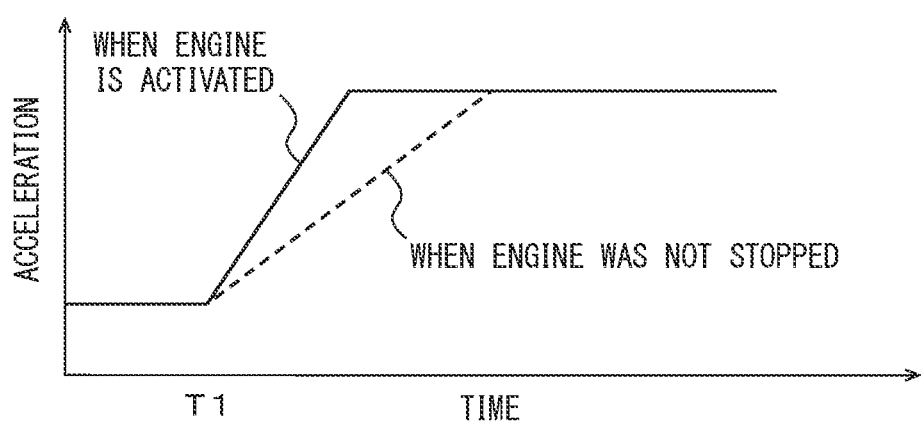
FIG. 4B is a diagram showing the relationship between acceleration and time.

FIG. 4A is a diagram showing the relationship between accelerator control signal and time, and FIG. 4B is a diagram showing the relationship between acceleration and time. When the drive unit 17 inputs the accelerator control signal from the vehicle control device 16, output from the engine 171 and/or electric motor 172 is increased. When the vehicle 10 is being driven primarily by the vehicle control system 1, the vehicle control device 16 generates an accelerator control signal based on the driving plan. When the vehicle 10 is being driven primarily by the driver, on the other hand, the vehicle control device 16 generates an accelerator control signal based on the degree of operation of the accelerator pedal (not shown) by the driver.

As shown in FIG. 1A, when the driver has made a request to the autonomous control system 1 of the vehicle 10 to move from the lane 51 to the adjacent passing lane 52, the vehicle control device 16 generates an accelerator control signal for increased acceleration, based on the driving plan.

FIG. 4A shows a graph where the accelerator control signal has changed so as to increase to time T1. When the engine 171 is activated, the drive unit 17 increases the output from the engine 171 and electric motor 172 according to the increase in the accelerator control signal, to accelerate the vehicle 10.

When the engine 171 was stopped, on the other hand, the drive unit 17 first activates the engine 171 according to the increase in the accelerator control signal, before increasing the output from the engine 171 and electric motor 172 to accelerate the vehicle 10. Thus, as shown in FIG. 4B, the degree of acceleration of the vehicle 10 is faster if the engine 171 was activated than if the engine 171 was stopped. This allows the drive unit 17 to rapidly accelerate the vehicle 10 in response to a request for lane change by the driver.

Figure 5:
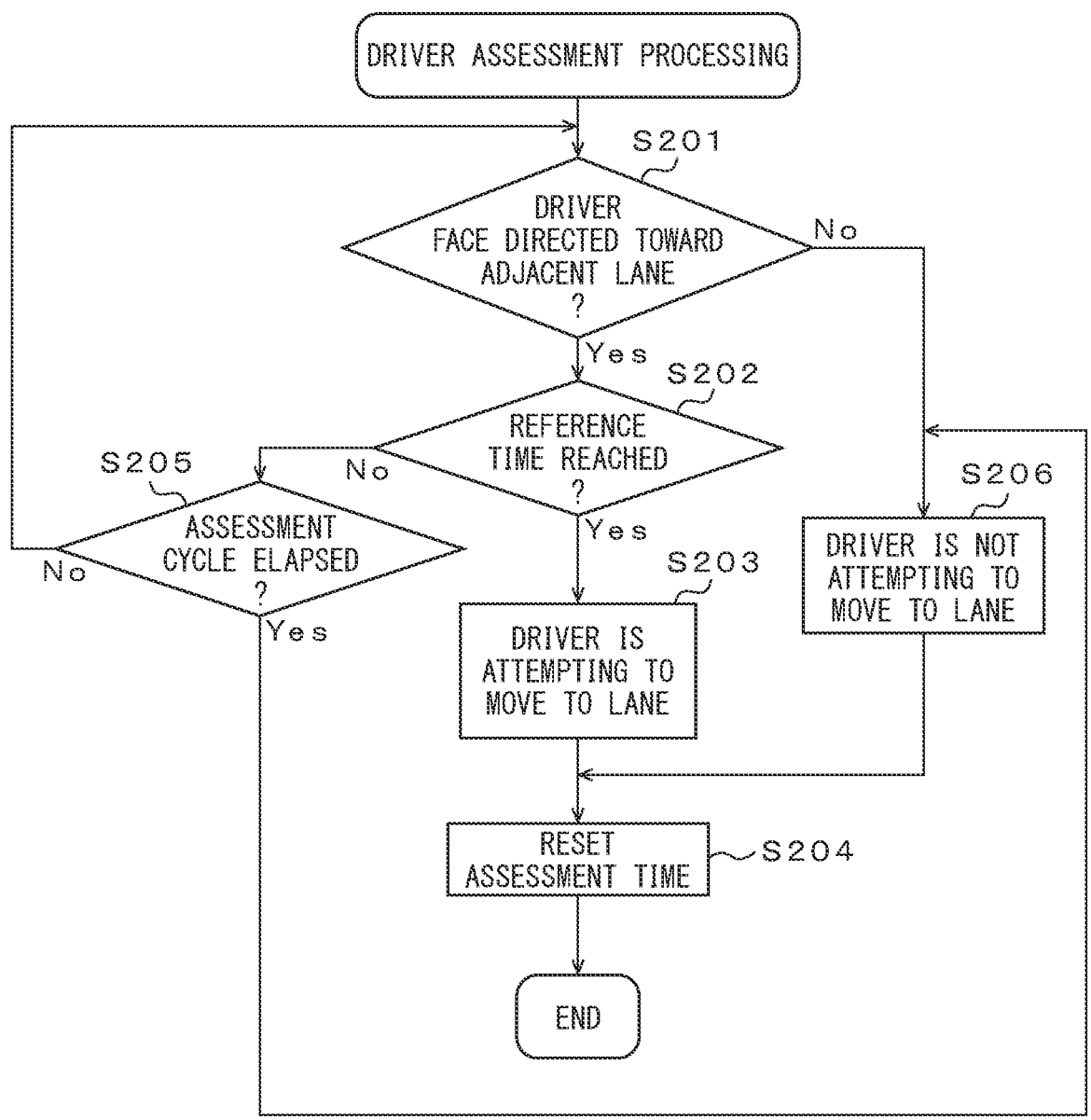
FIG. 5 is an example of an operation flow chart for driver assessment processing by the vehicle control device of the embodiment.

Driver assessment processing for determining whether or not the driver is attempting to move the vehicle 10 from the traveling lane in which the vehicle 10 is traveling to an adjacent lane in step S102 will now be described with reference to FIG. 5.

First, the determining unit 232 determines whether or not the face of the driver is oriented toward the adjacent lane (step S201). The orientation of the face of the driver is represented by the angle in the horizontal direction between the traveling direction of the vehicle 10 and the direction in which the face of the driver is facing, for example. The determining unit 232 has a classifier that has been trained to detect facial aspects such as eye corners, inner eye corners and mouth angles from images. The determining unit 232 inputs monitor images into the classifier to determine the locations of predetermined facial aspects in the monitor images. The determining unit 232 also compares the locations of the predetermined facial aspects detected from the monitor image against a standard facial three-dimensional model. The angle of the face in a three-dimensional model in which the location of each facial aspect maximally matches the aspect location detected from the monitor image is detected as the angle of the face in the monitor image.

The classifier may be a convolutional neural network (CNN) having multiple layers connected in series from the input end to the output end, for example. Facial images including predetermined facial aspects are previously input into the CNN as teacher data for learning, whereby the CNN functions as a classifier to identify the locations of predetermined facial aspects.

When the directional angle of the driver's face is directed at least at a predetermined angle (such as 30°) in the right or left direction with respect to the traveling direction of the vehicle 10, the determining unit 232 determines that the driver is attempting to move the vehicle 10 from the traveling lane in which the vehicle 10 is traveling to an adjacent lane that is adjacent either to the left or right.

Publicly known technology may also be used to determine the direction of the face of the driver based on monitor images. For example, the technology disclosed in Japanese Unexamined Patent Publication No. 2019-87150 may be used.

When the face of the driver is directed toward an adjacent lane (step S201—Yes), the determining unit 232 determines whether or not the estimated elapsed time as the time that the face of the driver has been facing the adjacent lane side has reached the reference time (step S202). Counting of the assessment time to confirm the assessment cycle is initiated from the point at which it is initially determined that the face of the driver is directed toward an adjacent lane. When the elapsed time has reached the reference time within the assessment cycle during driver assessment processing, it is determined that the driver is attempting to move the vehicle 10 from the traveling lane in which the vehicle 10 is traveling to an adjacent lane.

When the elapsed time has reached the reference time (step S202—Yes), the determining unit 232 determines that the driver is attempting to move the vehicle 10 from the traveling lane in which the vehicle 10 is traveling to an adjacent lane (step S203).

The determining unit 232 then resets the assessment time (step S204), and the series of processing steps is complete.

When the elapsed time has not reached the reference time (step S202—No), the determining unit 232 determines whether or not the assessment time from the point at which it was first determined that the face of the driver is directed toward an adjacent lane is beyond the assessment cycle (step S205). The assessment cycle is longer than the reference time.

When the assessment time has not elapsed beyond the assessment cycle (step S205—No), on the other hand, processing returns to the start of step S201. During the assessment cycle, the determining unit 232 determines whether or not the face of the driver is directed to the same adjacent lane (left or right) as before, from the second step S201 and afterwards. If the face of the driver is directed to the same adjacent lane as before, processing proceeds to step S202. If the face of the driver is not directed to the same adjacent lane as before, on the other hand, processing proceeds to step S206.

When the face of the driver is not directed toward an adjacent lane (step S201—No), or when the assessment time is beyond the assessment cycle (step S205—Yes), the determining unit 232 determines that the driver is not attempting to move the vehicle 10 from the traveling lane in which the vehicle 10 is traveling to an adjacent lane (step S206).

The determining unit 232 then resets the assessment time (step S204), and the series of processing steps is complete.

As explained above, the vehicle control device of this embodiment can accelerate a vehicle at an appropriate timing by activating the stopped engine when the driver is attempting to move the vehicle from the traveling lane to an adjacent lane.

Figure 6:
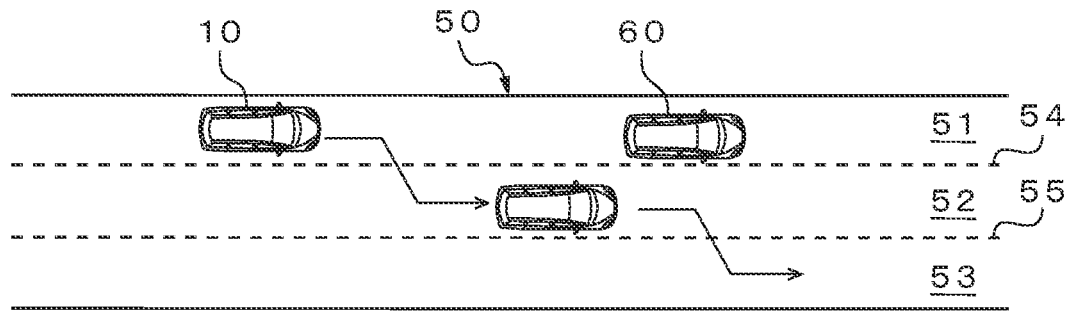
FIG. 6 is a diagram illustrating operation of a first modified example of the vehicle control device of the embodiment.
Figure 7:
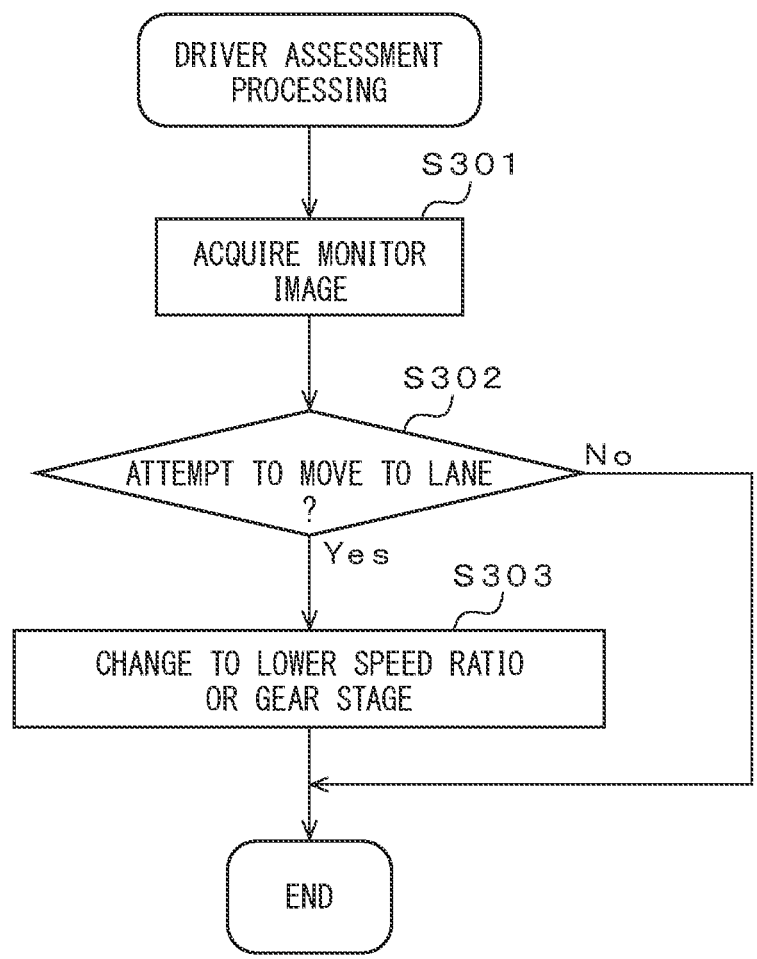
FIG. 7 is an example of an operation flow chart for driver assessment processing by a first modified example of the vehicle control device of the embodiment.

A first modified example and second modified example of the vehicle control device of this embodiment will now be described with reference to FIG. 6 to FIG. 8. FIG. 6 is a diagram illustrating an example of operation according to a first modified example of the vehicle control device of this embodiment, and FIG. 7 is an example of an operation flow chart for driver assessment processing according to the first modified example.

The vehicle 10 is traveling on the road 50, as shown in FIG. 6. The road 50 has three lanes, lanes 51, 52 and 53. The lane 51 and lane 52 are divided by a lane marking line 54, and the lane 52 and lane 53 are divided by a lane marking line 55. The vehicle 10 is traveling in the lane 51 while another vehicle 60 is traveling ahead of the vehicle 10.

The driver has decided to pass the other vehicle 60 ahead on the lane 51, and therefore directs the face several times to the lane 52 in order to examine the state of the adjacent passing lane 52.

Based on a monitor image taken of the area near the driving seat of the vehicle 10 by the monitoring camera 3, the vehicle control device 16 determines that the driver is attempting to move the vehicle 10 from the lane 51 in which the vehicle 10 is traveling to the adjacent lane 52.

Since the drive unit 17 had stopped the engine 171 and was obtaining drive power using the electric motor 172, the vehicle control device 16 activates the engine.

The driver also operates a direction indicator 4 and makes a request to the vehicle control system 1 for movement from the lane 51 to the adjacent passing lane 52.

Since a request has been made by the driver for movement of the vehicle 10 from the lane 51 to the adjacent lane 52, the vehicle control device 16 accelerates the vehicle 10 using drive power of the engine 171 and electric motor 172.

The vehicle 10 is moved between lanes by gently accelerating the vehicle 10 in response to the driver's request for a lane change.

The vehicle control device 16 activates the engine 171 to move from the lane 51 to the lane 52, after which it carries out the driver assessment processing shown in FIG. 7 at a driver assessment time having a predetermined cycle, during a predetermined time period. The driver assessment processing for a modified example will now be explained with reference to FIG. 7.

The determining unit 232 first acquires a monitor image from the monitoring camera 3 (step S301). The area near the driving seat is shown in the monitor image, and may include the face of the driver.

Next, based on the monitor image, the determining unit 232 determines whether or not the driver is attempting to move the vehicle 10 from the traveling lane in which the vehicle 10 is traveling to an adjacent lane (step S302).

When the driver is attempting to move the vehicle 10 from the traveling lane in which the vehicle 10 is traveling to an adjacent lane (step S302—Yes), the control unit 231 controls the automatic transmission 173 of the drive unit 17 to change the speed ratio or gear stage to a lower speed than the current speed (step S303), and the series of processing steps is complete.

When the driver is not attempting to move the vehicle 10 from the traveling lane in which the vehicle 10 is traveling to an adjacent lane (step S302—No), the series of processing steps is complete.

The driver also operates a direction indicator 4 and makes a request to the vehicle control system 1 of the vehicle 10 for movement from the lane 52 to the adjacent passing lane 53.

Since a request has been made by the driver for movement of the vehicle 10 from the lane 52 to the adjacent lane 53, the vehicle control device 16 accelerates the vehicle 10 using drive power of the engine 171 and electric motor 172, and using a lower-speed speed ratio or gear stage than the current one.

The vehicle 10 is caused to move between lanes by gently accelerating the vehicle 10 in response to the driver's request for a lane change.

When it has been determined that the driver is attempting to move between lanes, the vehicle control device 16 changes the speed ratio or gear stage to a lower speed than the current speed, allowing the vehicle 10 to be accelerated at an appropriate timing using drive power of the engine 171 and electric motor 172.

FIG. 8 is an example of an operation flow chart for vehicle control processing by a second modified example of the vehicle control device of the embodiment.

The vehicle control processing shown in FIG. 8 differs from the vehicle control processing shown in FIG. 3 in that step S404 is carried out between step S103 and step S104 of the vehicle control processing shown in FIG. 3. The processing of steps S401 to S403 and S405 to S407 is the same as that of steps S101 to S106 for the vehicle control processing shown in FIG. 3.

When the engine is stopped (step S403—Yes), the control unit 231 determines whether or not the speed of the vehicle 10 satisfies a predetermined relationship (step S404). The predetermined relationship is whether the difference between the average speed of another vehicle traveling in the adjacent lane and the speed of the vehicle 10, or the difference between the speed limit of the traveling lane and the speed of the vehicle 10, is at or above a predetermined reference speed difference. The adjacent lane is the lane to which movement of the vehicle 10 is being attempted by the driver, when moving from the traveling lane in which the vehicle 10 is traveling to an adjacent lane. The reference speed difference may be 15 km/h, for example. Based on object detection information, the control unit 231 ascertains the existence of other vehicles traveling on the adjacent lane. The control unit 231 also acquires the speed limit of the traveling lane based on map information.

When the speed of the vehicle 10 satisfies the predetermined relationship (step S404—Yes), the control unit 231 activates the engine 171 (step S405).

When the speed of the vehicle 10 does not satisfy the predetermined relationship (step S403—No), processing proceeds to step S406.

When the difference between the average speed of another vehicle traveling in the adjacent lane and the speed of the vehicle 10 is small, or the when difference between the traveling road speed limit and the speed of the vehicle 10 is small, the speed of the vehicle 10 will be close to the speed of other vehicles traveling on the lane ahead, and therefore drive power will likely be sufficient without activating the engine 171. The vehicle control device 16 therefore does not activate the engine 171 in such cases.

The vehicle control device, the computer program for vehicle control and the method for controlling a vehicle according to the embodiment described above may incorporate appropriate modifications that are still within the gist of the disclosure. Moreover, the technical scope of the disclosure is not limited to these embodiments, and includes the invention and its equivalents as laid out in the Claims.

For example, the method for determining that the driver is attempting to move the vehicle from the traveling lane to the adjacent lane is not limited to the method described for the embodiment. Instead, the direction of the driver's line of sight may be determined based on a monitor image, determining whether or not the driver is attempting to move the vehicle from the traveling lane to an adjacent lane based on the direction of the line of sight.

The invention claimed is:

1. A vehicle control device for a vehicle having an engine and an electric motor, which comprises:
   a processor configured to
      determine whether or not a driver is attempting to move the vehicle from a traveling lane in which the vehicle is traveling to an adjacent lane, based on a monitor image taken of an area near a driving seat,
      based upon the determination that the driver is attempting to move the vehicle, from the traveling lane in which the vehicle is currently traveling to the adjacent lane, determine whether or not the engine is active,
      based upon the determination that the engine is not active, determine whether a speed difference between a speed of the vehicle and an average speed of another vehicle traveling in the adjacent lane, or difference between the speed of the vehicle and a traveling lane speed limit, is at or above a predetermined reference speed difference,
      based upon the determination that (i) the driver is attempting to move the vehicle from the traveling lane to the adjacent lane, (ii) the engine is not active while drive power is being obtained using the electric motor, and (iii) the speed difference is at or above the predetermined reference speed difference, activate the engine, and
      after activating the engine and in response to a request by the driver to move the vehicle from the traveling lane to the adjacent lane, accelerate the vehicle using the drive power of the engine and the electric motor.

2. The vehicle control device according to claim 1, wherein the processor is further configured to determine the direction of the face of the driver based on the monitor image, and if the elapsed time obtained by summing the time that the face of the driver has been facing the adjacent lane side within a predetermined assessment cycle has reached a first reference time, to determine that the driver is attempting to move the vehicle from the traveling lane to the adjacent lane.

3. The vehicle control device according to claim 1, wherein the request by the driver to move the vehicle from the traveling lane to the adjacent lane is executed by the driver operating a direction indicator of the vehicle.

4. A computer-readable, non-transitory storage medium storing a computer program for vehicle control, that controls a vehicle having an engine and an electric motor, and that causes a processor execute a process and the process comprising:
   determining whether or not a driver is attempting to move the vehicle from a traveling lane in which the vehicle is traveling to an adjacent lane, based on a monitor image taken of an area near a driving seat;
   based upon the determination that the driver is attempting to move the vehicle, from the traveling lane in which the vehicle is currently traveling to the adjacent lane, determining whether or not the engine is active;
   based upon the determination that the engine is not active, determining whether a speed difference between a speed of the vehicle and an average speed of another vehicle traveling in the adjacent lane, or difference between the speed of the vehicle and a traveling lane speed limit, is at or above a predetermined reference speed difference;
   based upon the determination that (i) the driver is attempting to move the vehicle from the traveling lane to the adjacent lane, (ii) the engine is not active while drive power is being obtained using the electric motor, and (iii) the speed difference is at or above the predetermined reference speed difference, activating the engine; and
   after activating the engine and in response to a request by the driver to move the vehicle from the traveling lane to the adjacent lane, accelerating the vehicle using the drive power of the engine and the electric motor.

5. A method for controlling a vehicle which is carried out by a vehicle control device that controls a vehicle having an engine and an electric motor, and the method comprising:
   determining whether or not a driver is attempting to move the vehicle from a traveling lane in which the vehicle is traveling to an adjacent lane, based on a monitor image taken of an area near a driving seat;
   based upon the determination that the driver is attempting to move the vehicle, from the traveling lane in which the vehicle is currently traveling to the adjacent lane, determining whether or not the engine is active;
   based upon the determination that the engine is not active, determining whether a speed difference between a speed of the vehicle and an average speed of another vehicle traveling in the adjacent lane, or difference between the speed of the vehicle and a traveling lane speed limit, is at or above a predetermined reference speed difference;
   based upon the determination that (i) the driver is attempting to move the vehicle from the traveling lane to the adjacent lane, (ii) the engine is not active while drive power is being obtained using the electric motor, and (iii) the speed difference is at or above the predetermined reference speed difference, activating the engine; and after activating the engine and in response to a request by the driver to move the vehicle from the traveling lane to the adjacent lane, accelerating the vehicle using the drive power of the engine and the electric motor.

* * * * *